Figure 1:
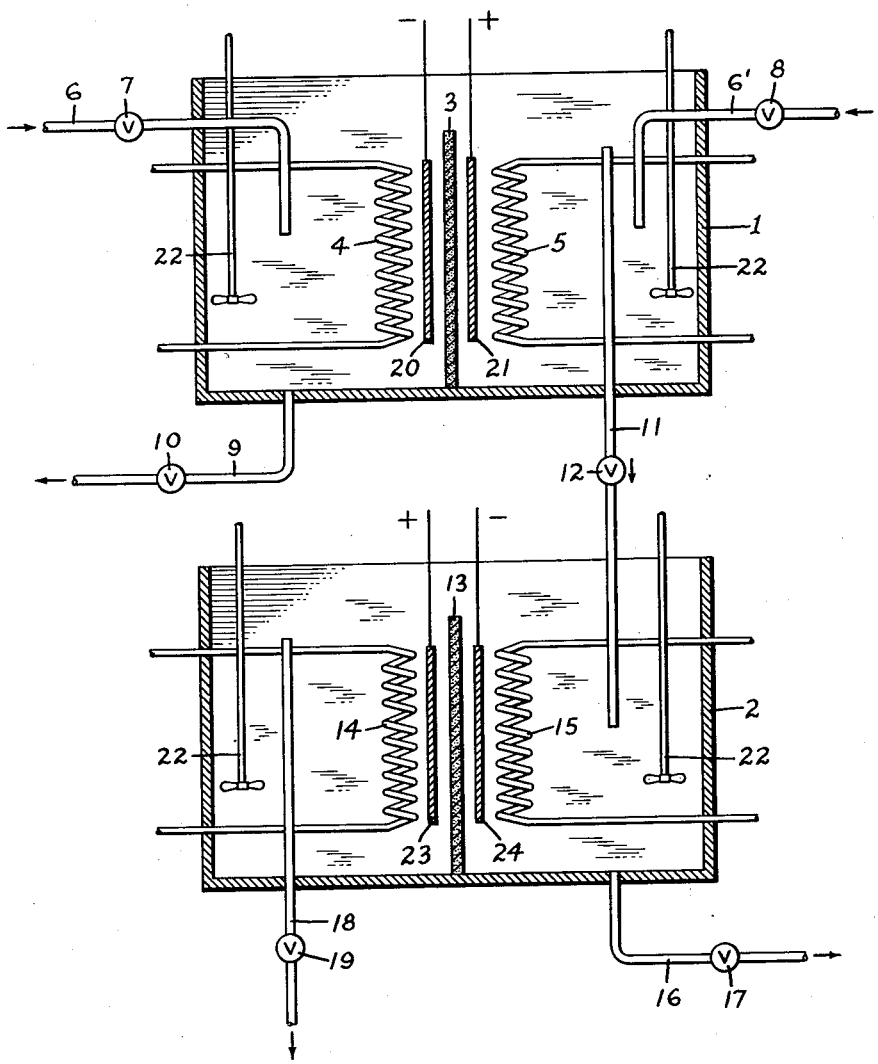

May 21, 1957   N. VISNAPUU   2,793,182
PROCESS FOR THE REGENERATION OF SPENT ALKYLATION SULFURIC ACID
Filed Aug. 21, 1953

INVENTOR.
NAIMA VISNAPUU
BY
Campbell, Brumbaugh, Free & Graves
HER ATTORNEYS.

United States Patent Office 2,793,182
Patented May 21, 1957

2,793,182

PROCESS FOR THE REGENERATION OF SPENT ALKYLATION SULFURIC ACID

Naima Visnapuu, Cleveland, Ohio, assignor to The Standard Oil Company, Cleveland, Ohio, a corporation of Ohio Application August 21, 1953, Serial No. 375,654

1 Claim. (Cl. 204—130)

The present invention relates to a process and an apparatus for the regeneration of spent alkylation sulfuric acid.

The alkylation of isoparaffins with olefins to produce "alkylate" gasoline using concentrated sulfuric acid as a catalyst is a commercial process which has found wide use in the petroleum industry. In a typical alkylation process, isoparaffins and olefins in the liquid phase are contacted with concentrated sulfuric acid of approximately 98% strength. The hydrocarbon and the acid phases are separated and the acid is reused. During repeated reuse in the process, the acid becomes "spent" and when the concentration of the acid falls to 85 to 90% concentration, or at the lowest 80% concentration, it becomes necessary to withdraw the spent acid and supply fresh acid to the reaction. The spent acid is a more or less standardized material which varies but very little in composition between different alkylation plants. Many authorities believe that the acid becomes spent because of the fact that the olefins in the alkylation feed are dehydrogenated to more unsaturated compounds which are soluble in the sulfuric acid phase and which dilute the acid catalyst. Whether or not this is a true explanation of how the acid becomes spent, it is known that the spent acid is a mixture of at least 80% sulfuric acid with the balance primarily various hydrocarbon contaminants and with a small amount of water in the acid phase. At least part of the hydrocarbon contaminants is thought to exist in the form of an acid-hydrocarbon complex in the acid phase. Although its composition is not precisely known, "spent alkylation sulfuric acid" is well-known in the industry by that name and those skilled in the art are well aware of its identity and characteristics.

Since the disposal of the spent acid is troublesome and uneconomical, the problem of regenerating the spent acid has received serious consideration in the past, and many methods have been devised for the regeneration of the acid. As example of these prior art methods of regeneration, reference is made to U. S. Patent No. 2,015,254 which describes a method of regenerating the spent acid which comprises oxidizing the impurities by air. In U. S. Patent No. 2,287,732 the spent acid is chilled and thereafter the impurities may be removed by decanting. In U. S. Patent No. 2,418,210 the acid is regenerated by heating to form a coke out of the impurities which may then be mechanically separated. In U. S. Patent No. 2,588,331 regeneration is accomplished by sulfonation of the spent acid at high temperatures to form $SO_2$ and $CO_2$ and thereby remove the impurities.

In contrast to the prior art methods for the regeneration of spent alkylation sulfuric acid, the method of the present invention involves the regeneration of the spent alkylation acid by electrolysis.

In U. S. Patent No. 1,630,074 to Rogers et al., there is described a method for removing organic matter from refinery sludge acids by electrolysis of the acid in a diaphragmless cell. It is stated in that patent that the acid is preferably diluted to 35 to 45° Baumé by the addition of water or more dilute sludge acids and that the electrolytic process is accelerated by heating the sludge acid to a temperature of at least 100° F. The effect of the electrolysis, according to the patentees, is to cause oxidation and coagulation of the organic matter which is carried to the surface of the acid where it can be removed. There is not obtained according to this method any increase in the concentration of the acid.

In copending application Serial No. 350,097, filed April 21, 1953, there is disclosed and claimed a method for the regeneration of spent alkylation sulfuric acid which comprises electrolyzing the acid in a compartmented electrolytic cell, i. e., one separated into compartments by a permeable diaphragm, and recovering reconcentrated and purified acid from the anode compartment of said cell and recovering waste acid from the cathode compartment of the cell.

In copending application Serial No. 368,509 filed July 16, 1953, there is disclosed and claimed a process for the regeneration of spent alkylation sulfuric acid which constitutes an improvement over the method described in the aforesaid application Serial No. 350,097, filed April 21, 1953. In that improved process, the spent alkylation acid is electrolyzed in a compartmented electrolytic cell at an initial temperature not exceeding about 80° F. and thereafter the temperature is raised.

In copending application Serial No. 368,540, filed July 16, 1953, there is disclosed an additional improvement over the processes described in the aforesaid copending applications. In the process of application Serial No. 368,540, the electrolysis of the spent alkylation sulfuric acid is accelerated by maintaining the temperature of the acid in the anode compartment of the cell at least about 5° F. higher than the temperature of the acid in the cathode compartment of the cell.

The process of the present invention is an improved process which is capable of utilizing to better advantage the discoveries of all of said copending applications. In brief, the process comprises the steps of electrolyzing spent alkylation sulfuric acid in a first compartmented electrolytic cell until the acid in the anode compartment of said first cell has been partially reconcentrated, transferring said partially reconcentrated acid to the cathode compartment of a second compartmented electrolytic cell and continuing the electrolysis of said acid in said second cell.

The present process has several advantages. First, it can be operated continuously with maximum convenience. Second, if it is desired to apply the teachings of copending application Serial No. 368,509, filed July 16, 1953, or the teachings of application Serial No. 368,540, filed July 16, 1953, it is possible to operate the process with a controlled temperature in each compartment of the first and second cells and the temperatures in each cell need not be changed during the process as would be the case if only one cell were employed. Third, it is an advantage of the process that the acid which is being electrolyzed in the second cell has been already partially "cleaned up" in the first cell, and, as a result, the electrolysis in the second cell proceeds unhindered by the presence of relatively large quantities of organic impurities.

Before describing the process of the invention in greater detail, an understanding of the invention will be facilitated by a description of the apparatus of the invention. This description of the apparatus shall be made with reference to the attached drawing in which Figure 1 is a sectional view in elevation of one embodiment of the apparatus of this invention.

Referring specifically to Figure 1, there is shown a combination of two electrolytic cells, 1 and 2. As can be seen, cell 1 is divided into two compartments by a permeable diaphragm 3, the compartment to the left of the drawing being the cathode compartment and the compartment to the right of the drawing, the anode compartment. Each compartment is respectively provided with a cathode 20 and an anode 21. Each compartment is also equipped with an agitator 22 and with means for heating or for cooling the interior of the compartment. In this case coils 4 and 5 for the circulation of a heat transfer medium are illustrated.

There is also illustrated in the drawing means for supplying liquid to each compartment of cell 1 in the form of conduits 6 and 6' which are equipped respectively with flow controlling valves 7 and 8. Cell 1 is also provided with an outlet pipe 9 leading from the bottom of the cathode compartment, the pipe 9 being equipped with flow controlling valve 10. Within the anode compartment of cell 1 there is shown a constant level overflow tube 11 which leads vertically downward through the bottom wall of the cell and which is provided also with a flow controlling valve 12.

Cell 2 is illustrated in the drawing vertically beneath cell 1, but in the case of cell 2 the anode compartment is located to the right of the drawing and the cathode compartment to the left of the drawing with the permeable diaphragm 13 separating the two compartments. The anode and cathode are numbered 23 and 24 respectively. As in the case of cell 1, the compartments of cell 2 are provided with heat transfer coils which are numbered 14 and 15 respectively and with agitators 22.

As in the case of cell 1, the cathode compartment of cell 2 is provided with an outlet pipe 16 which in turn is provided with a valve 17, and the anode compartment of cell 2 is provided with a constant level overflow tube 18 which in turn is provided with a valve 19. As can further be seen from the drawing, the arrangement of the cells is such that the constant level overflow tube leading from the anode compartment of cell 1 empties into the cathode compartment of cell 2.

Except for the features which have been described in connection with the drawing the construction of the apparatus is otherwise conventional. For example, the cells are preferably constructed of a material which is resistant to sulfuric acid, such as lead or glass-lined metal. The permeable diaphragms are also composed of materials known in the art such as, for example, porous clay, fiberglass, Alundum-Carborundum, and asbestos. Likewise the various pipes, heat transfer coils and the like should preferably be composed of a material which is resistant to the action of sulfuric acid. The anodes and cathodes of the cells are similarly constructed of conventional materials, and, as disclosed in copending application Serial No. 350,097, filed April 21, 1953, the anode should preferably be composed of a material which is insoluble in sulfuric acid and which is resistant to oxidation by sulfuric acid. Suitable materials for the anode include platinum and palladium. The material of which the cathodes are constructed is not at all critical and suitable materials include graphite, lead, copper, mercury, nickel and platinum.

The process of the invention is further illustratable by the operation of the apparatus just described. In the operation of the apparatus, cell 1 is filled initially with spent alkylation sulfuric acid supplied through conduits 6 and 6'. If desired, the temperature of the spent acid in each of the compartments of cell 1 can then be individually adjusted to any desired temperature. For example, there can be created a temperature differential between the compartments by raising the temperature of the acid in the anode compartment to a temperature above that of the acid in the cathode compartment, thereby realizing the benefits described in my copending application Serial No. 368,540, filed July 16, 1953.

A direct current is then passed between the anode and the cathode of cell 1 to begin the electrolysis of the acid and, as the electrolysis proceeds, the acid in the anode compartment of cell 1 undergoes partial reconcentration and the bulk of the impurities which were in the spent alkylation sulfuric acid begin to accumulate in the cathode compartment of cell 1. From this point on, the operation may be either continuous or batchwise as desired, but since a continuous operation is generally advantageous, this type of operation will be discussed as illustrative.

When the acid in cell 1 has become partially reconcentrated, a continuous inflow of spent alkylation sulfuric acid is started through conduit 6 under the control of valve 7 into the cathode compartment of cell 1. As the level of acid in the cathode compartment of cell 1 rises, there is established a seepage of the acid through the diaphragm 3 which is sufficiently permeable to liquid flow to allow a slow migration of the acid from the cathode compartment to the anode compartment of the cell. This seepage of the acid from the cathode compartment to the anode compartment results in an increase in the level of acid in the anode compartment and thereby acid overflows through the overflow tube 11 into the cathode compartment of cell 2. The rate of flow is of course highly variable depending on the size of the cells and on the type of diaphragm that is being used.

As the flow of partially reconcentrated acid continues into cell 2 the acid migrates through the diaphragm 13 and eventually fills both compartments of the cell up to the level of overflow tube 18. During the time the cell is filling the temperature of the acid in each compartment of cell 2 can be individually adjusted by supplying a heat transfer medium through coils 14 and 15. In this manner it is possible to follow not only the teachings of copending application Serial No. 368,540, filed July 16, 1953, by maintaining a temperature differential between the anode and the cathode compartments of cell 2 but it is also possible to obtain the advantages of the process described in copending application Serial No. 368,509, filed July 16, 1953, by maintaining a higher temperature in cell 2 than in cell 1. In this connection, it is pointed out that, if one desired to follow the teachings of copending application Serial No. 368,509, filed July 16, 1953, by raising the temperature of the acid during the electrolysis utilizing only one cell, it would not be possible to establish a continuous process but that only batch processes could be performed.

When the acid in cell 2 has substantially submerged the electrodes of the cell a direct current is passed between the electrodes and the electrolysis of the acid is continued in cell 2. Finally, when the level of the acid in the anode compartment of cell 2 reaches the top of overflow tube 18, there is achieved a steady flow of the acid through tube 18 and this now completely reconcentrated acid can be returned to an alkylation reaction for reuse. For time to time during the process valves 10 and 17 which are normally closed can be opened for the purpose of bleeding off impurities and sludge which have accumulated during the electrolysis in the respective cathode compartments of cells 1 and 2.

From the preceding description it can be seen that both the process and the apparatus of the invention possess many advantages. As already pointed out, the apparatus and process are extremely flexible and can be adapted to a variety of processing condition and can operate in a continuous manner which would often be impossible in the case of an electrolysis in a single cell. Another advantage of the process is that the partially reconcentrtaed acid which is transferred to cell 2 has already been cleaned of an appreciable amount of its impurities and the operation in cell 2 is not complicated by the presence of large amounts of organic impurities as is often the case in a single cell operation.

It is further evident from the description given hereinabove that the apparatus and process of the invention can be modified in many ways without departing from the spirit of the invention. For example, instead of locating the cells one beneath the other so that the partially reconcentrated acid may flow from cell 1 to cell 2 by virtue of gravity, it is possible to locate the cells on substantially the same level and to pump acid from the first cell to the second cell. It is further evident that the invention is not limited to the embodiment shown in which two cells are illustrated. Instead it is possible to employ any number of cells in accordance with the invention in which the flow of partially reconcentrated acid is from the anode compartment of one cell to the cathode compartment of the succeeding cell.

The degree of reconcentration to be achieved in each cell is highly variable and will ordinarily depend on the number of cells employed. In the case of a two cell operation, for example, it is sometimes desirable to obtain about one-half of the desired reconcentration in each cell. On the other hand, it is sometimes preferable to employ an apparatus in which a first cell is followed in series by a plurality of cells in parallel arrangement and, in this case, the reconcentration in the first cell can be allowed to proceed only until initial foaming and sludging have subsided and then the acid in the anode compartment can be transferred to the succeeding cells wherein the greater part of the reconcentration will be obtained at a higher temperature.

In order to illustrate the process of the invention, the following example is given. Parts are by weight.

*Example*

The apparatus employed in this example was similar to the apparatus depicted in the drawing.

In starting operation, the first cell of the apparatus was filled to the top of the overflow tube in the anode compartment with 100 parts of a spent alkylation sulfuric acid analyzing 88% sulfuric acid. The temperature of acid in the anode compartment was adjusted to about 90° F. and in the cathode compartment, to about 60° F. There was then impressed across the electrodes of the first cell a voltage sufficient to supply 1.5 amperes of current, and the electrolysis was allowed to proceed until the partially reconcentrated acid in the anode compartment of the cell analyzed about 93% sulfuric acid. At this point there was begun an inflow of additional spent alkylation sulfuric acid through conduit 6 at the rate of 4 parts of acid per hour. As the inflow of acid continued, partially reconcentrated acid from the anode compartment of the first cell began to overflow through the tube therein and the overflow of acid was allowed to flow under gravity into the cathode compartment of the second electrolytic cell located beneath the first cell.

As the second electrolytic cell began to fill with the partially reconcentrated acid, the temperature of the acid in the anode and cathode compartments was adjusted to 130° F. and 90° F., respectively. When the acid had submerged the electrodes in the second cell, a voltage was impressed between the electrodes to supply the same amount of direct current as in the first cell operation, and the electrolysis was continued in the second cell. As the inflow of acid into the second cell continued, the level of acid in the anode compartment rose to the top of the overflow tube located in that compartment and there was thereby established a constant overflow of substantially colorless acid having a concentration of 98% at the rate of about 4 parts per hour. The process was allowed to operate continuously in this manner for several days during which time at periodic intervals the outlet in the bottom of each cathode compartment was opened to remove sediment and sludge which had collected therein.

It is intended to cover all changes and modifications in the examples and illustrations of the invention, herein given for purposes of disclosure, which do not constitute departure from the spirit and scope of the appended claim.

I claim:

A continuous process for the electrolysis of spent alkylation sulfuric acid which comprises electrolyzing spent alkylation sulfuric acid in a first electrolytic cell divided into anode and cathode compartments by a permeable diaphragm until the acid in the anode compartment of said first cell has become partially reconcentrated, continuously supplying spent alkylation sulfuric acid to the cathode compartment of said first cell, continuously transferring partially reconcentrated acid from the anode compartment of said first cell to the cathode compartment of a second cell divided into anode and cathode compartments by a permeable diaphragm whereby there is established a continuous flow of acid from the cathode compartment to the anode compartment of each cell through the permeable diaphragm thereof, continuing the electrolysis of said partially reconcentrated acid in said second cell and continuously withdrawing reconcentrated acid from the anode compartment of said second cell; the anode compartment of the second cell having a higher temperature than the anode compartment of the first cell and the cathode compartment of the second cell having a higher temperature than the cathode compartment of the first cell.

References Cited in the file of this patent

UNITED STATES PATENTS

| | | |
|---|---|---|
| 492,003 | Gall et al. | Feb. 21, 1893 |
| 916,900 | Teichner | Mar. 30, 1909 |
| 1,008,383 | Sparre | Nov. 14, 1911 |
| 1,315,546 | Curme | Sept. 9, 1919 |
| 1,630,074 | Rogers | May 24, 1927 |
| 2,333,578 | Knox et al. | Nov. 2, 1943 |
| 2,341,356 | Briggs | Feb. 8, 1944 |
| 2,535,035 | Briggs | Dec. 26, 1950 |

FOREIGN PATENTS

| | | |
|---|---|---|
| 127,985 | Germany | Feb. 5, 1902 |
| 226,002 | Switzerland | July 1, 1943 |